United States Patent [19]

Cochet et al.

[11] Patent Number: 4,564,469

[45] Date of Patent: Jan. 14, 1986

[54] PROCESS FOR STORING FLEXIBLE CONTAMINATED MATERIALS

[75] Inventors: André Cochet, Saint Cyr l'Ecole; Roger Droussent, Saint Remy les Chevreuse; Marcel Jurado, Argenteuil, all of France

[73] Assignee: Commissariat a l'Energie, Paris, France

[21] Appl. No.: 536,505

[22] Filed: Sep. 28, 1983

[30] Foreign Application Priority Data

Sep. 28, 1982 [FR] France ................................ 82 16285

[51] Int. Cl.[4] ........................ B30B 15/00; C09K 11/04

[52] U.S. Cl. ...................................... 252/626; 53/330; 53/526; 100/219; 100/220; 100/181

[58] Field of Search ................ 252/626; 100/220, 219, 100/181; 53/330, 526

[56] References Cited

U.S. PATENT DOCUMENTS

| | | | |
|---|---|---|---|
| 532,750 | 1/1895 | Banister et al. | 100/220 |
| 1,002,559 | 9/1911 | Brown | 53/330 |
| 1,242,232 | 10/1917 | Palm | 100/219 |
| 3,157,086 | 11/1964 | Bachhuber | 86/27 |
| 3,757,682 | 9/1973 | Ritchie | 100/220 |
| 4,462,310 | 7/1984 | Jackson et al. | 100/219 |

FOREIGN PATENT DOCUMENTS

| | | |
|---|---|---|
| 0004381 | 1/1982 | European Pat. Off. . |
| 2214871 | 10/1973 | Fed. Rep. of Germany . |
| 1131629 | 10/1968 | United Kingdom . |

*Primary Examiner*—Edward A. Miller
*Attorney, Agent, or Firm*—Dennis P. Clarke

[57] ABSTRACT

The present invention relates to a process and an apparatus for storing contaminated waste material by compacting. The waste material is placed in a drum, it is compressed by forcing a precover into the drum and whose edges are made deformable in order to prevent the rising of the precover, by its edges locking on the walls of the drum, particularly by engaging in grooves made in these walls. The cycle is then repeated until the drum is completely full. Application to the storage of radioactive waste.

4 Claims, 5 Drawing Figures

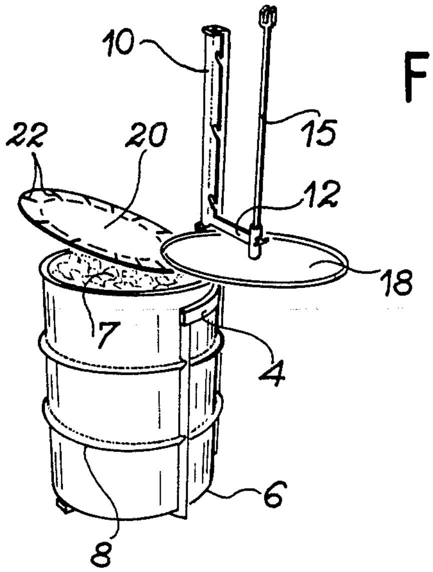
FIG. 3a
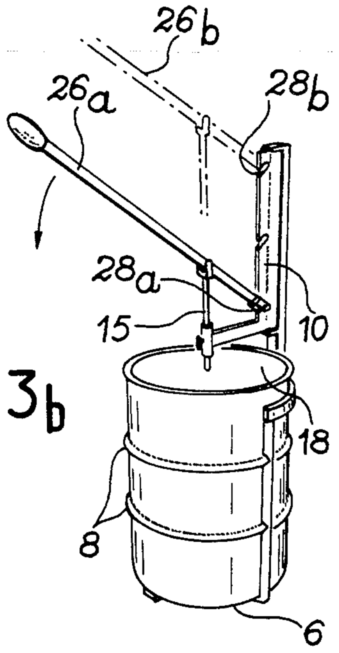
FIG. 3b
FIG. 3c
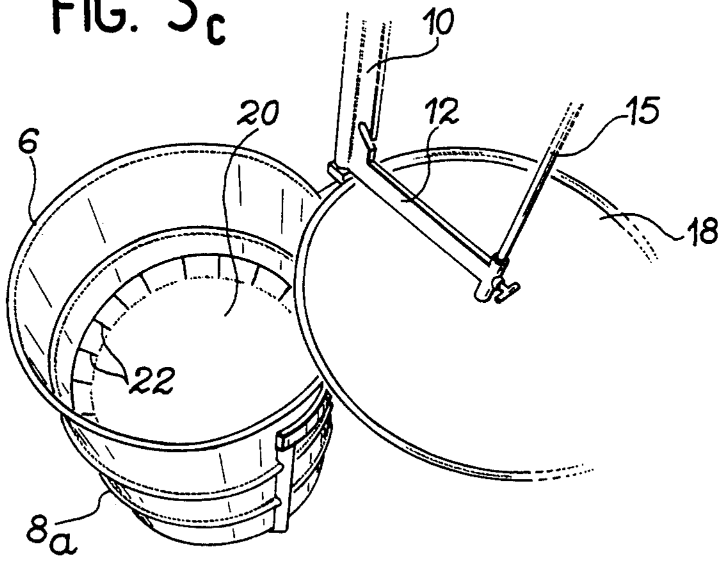

PROCESS FOR STORING FLEXIBLE CONTAMINATED MATERIALS

BACKGROUND OF THE INVENTION

The present invention relates to a process and to an apparatus for storing flexible contaminated materials. More specifically, it relates to a process and apparatus making it possible to increase the quantity of products stored in a given volume, In laboratories and hospitals, contaminated flexible objects (overgarments, overalls, overboots, gloves, cottons, rags, vinyl, etc.) are normally stored with a view to a subsequent decontamination treatment or with a view to their removal to a waste material storage area. These objects are generally deposited by the users in metal drums in order to shield them against external conditions and localise any possible contamination. Once sealed, the drums are transported to the processing or storage locations.

This operating procedure suffers from the disadvantage that such objects cannot be compressed in the drums due to their flexibility or elasticity and consequently only a relatively small quantity of waste materials can be stored in a given volume.

SUMMARY OF THE INVENTION

The object of the present invention is to improve the efficiency of this operation, by making it possible to store a large amount of waste material in a drum having a given volume.

According to the main feature of the process according to the invention, this comprises the following stages:

- the waste material is placed in a drum, above the waste material is placed a precover having a diameter slightly larger than that of the drum and whose edges have been made deformable,
- the precover is inserted into the drum in order to compact the waste material, the precover being prevented from rising again due to the locking of its edges against the drum walls, and
- the cycle is recommenced by again placing waste material into the drum, until the latter is completely filled.

Preferably, the drum has grooves and the locking of the edges of the precover takes place in these grooves.

According to the preferred embodiment, the precover is constituted by a cardboard disk, whose edges carry radial slots.

The invention also relates to an apparatus for performing this process. According to the main feature of the apparatus, the latter has on the one hand means for installing the drum and on the other means for applying a pressure to the precover.

According to a preferred embodiment, the means for installing the cover comprise a vertical column, on which is mounted a semicircular arch, whose diameter corresponds to that of the drum.

According to another feature of this apparatus, the means making it possible to apply a pressure to the precover comprise:

- a vertical support,
- an arm rotatable about a vertical axis integral with the support,
- a sliding rod which can slide through a guide tube mounted at one end of the arm,
- a compression disk mounted at one end of the sliding rod, and
- a lever making it possible to exert a force on the other end of the sliding rod.

Preferably, the column and support coincide, or the support is fixed to the column.

BRIEF DESCRIPTION OF THE DRAWINGS

The invention is described in greater detail hereinafter relative to non-limitative embodiments and with reference to the attached drawings, wherein show:

FIGS. 3*a* to 3*c* diagrammatic perspective views illustrating the different phases of a compression or compacting cycle.

DETAILED DESCRIPTION OF THE INVENTION

Figure 1:
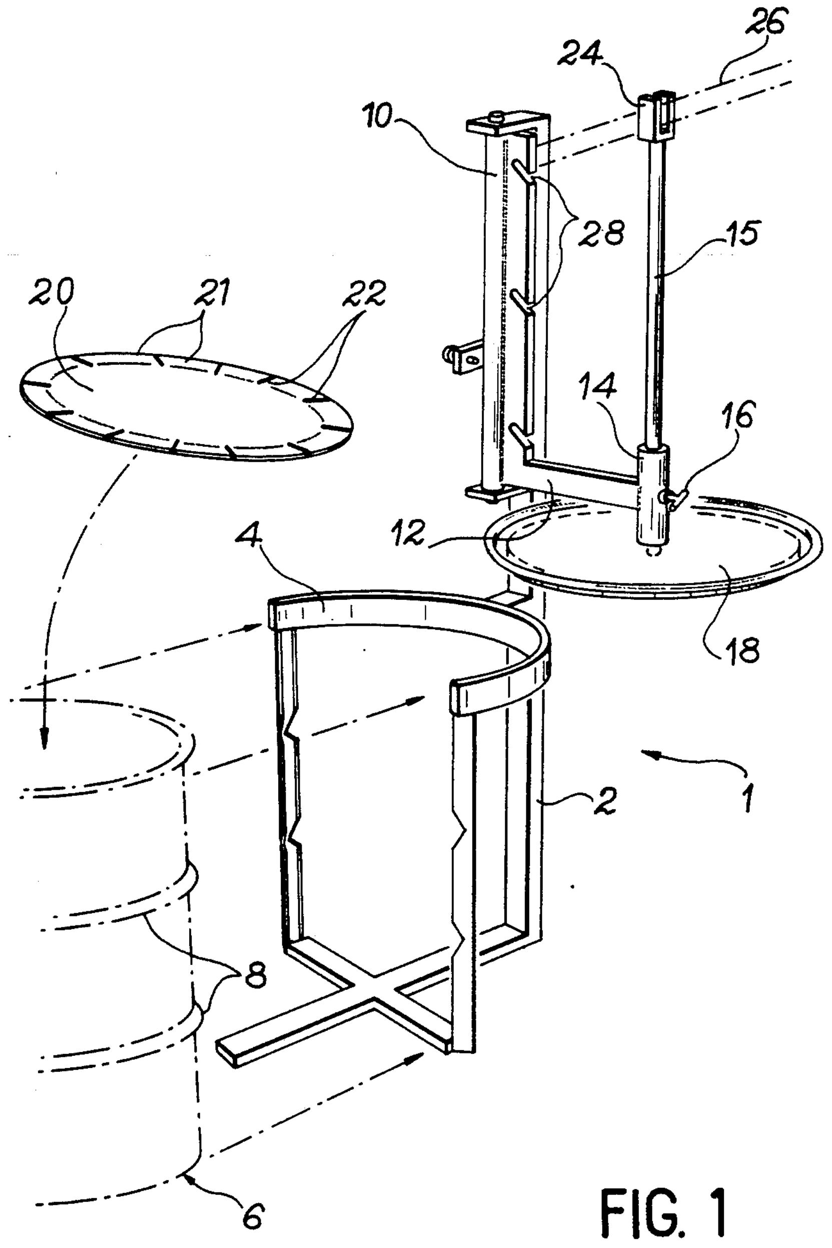
FIG. 1 a diagrammatic perspective view of the apparatus according to the invention.

FIG. 1 shows the apparatus according to the invention, which essentially comprises a vertical column 2, to which is fixed a half-arch 4, whose diameter corresponds to the diameter of drum 6 shown in broken lines, in which it is desired to compress or compact the waste material. This is a metal drum of a type used in commerce and which has, regularly distributed over its axis, grooves such as 8, which project to the outside. The drawing also shows the vertical support 10, fixed to the upper part of column 2, support 10 being integral with a horizontal arm 12, whose end opposite to support 10 has a guide tube 14, in which can vertically slide a rod 15. The latter can be fixed in guide tube 14 by a fixing means, e.g. a screw 16. A cover 18, identical to those used on drums, is centrally perforated in order to be threaded on to rod 15 and is held by a compression disk 17, screwed into the lower part of the latter, as illustrated in FIG. 2.

FIG. 1 also shows the cardboard precover 20 which is used for each waste material compression cycle in drum 6. As can be seen from the drawing, the diameter of precover 20 is slightly exceeds the internal diameter of drum 6. However, its edges carry radial slots such as 22, so that it can be moved into drum 6, as a result of the deformation of its edges. Thus, the portion 21 between two radial slots 22 rise during the downward movement. Rod 15 is terminated in its upper part by a yoke 24, into which can be introduced a lever 26, diagrammatically shown in broken lines in the drawing. Recesses 28 made in vertical support 10 act as support points for lever 26.

Figure 2:
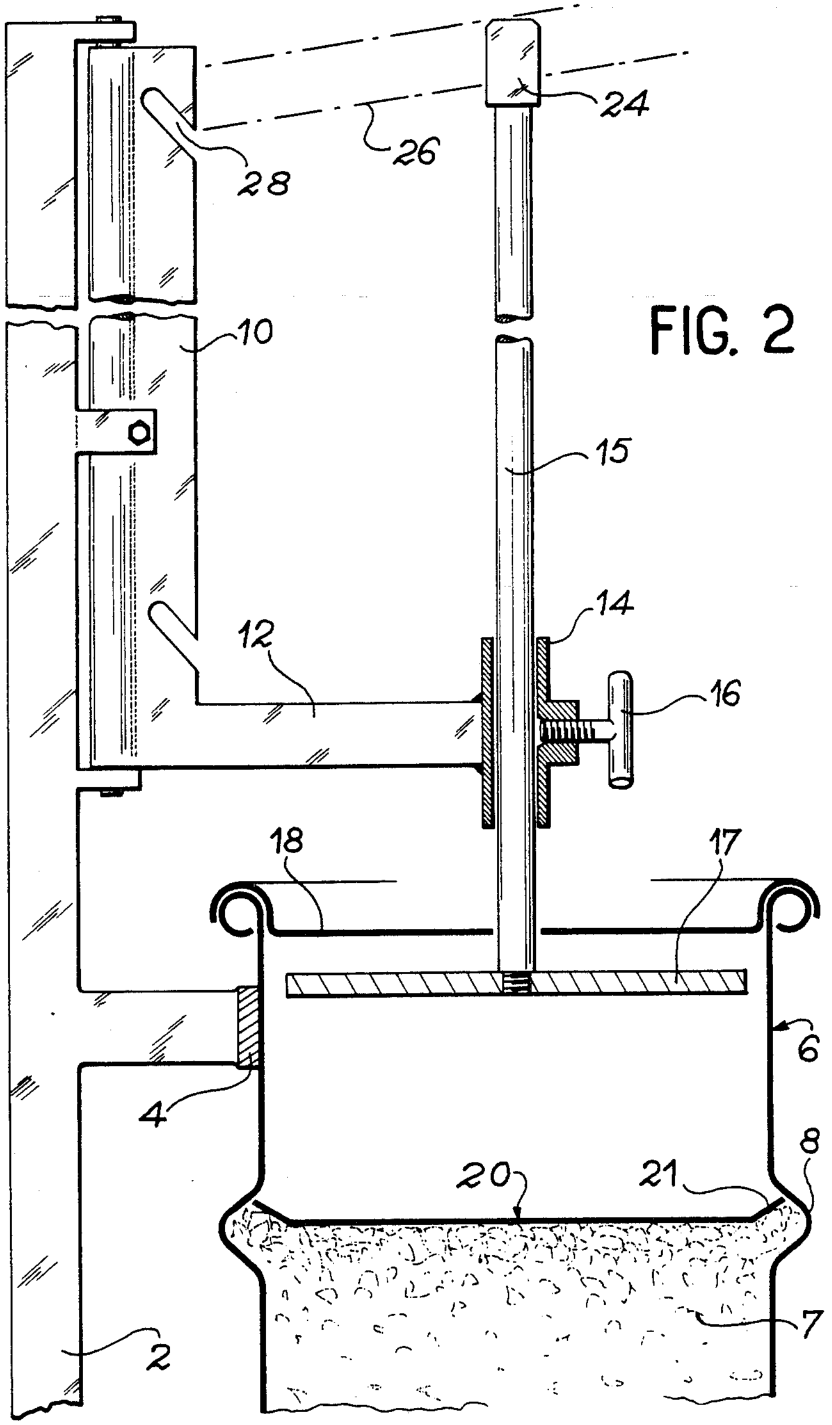
FIG. 2 a diagrammatic vertical sectional view of this apparatus showing how the waste material is compacted within the drum.

The carrying out of a waste material compacting cycle is illustrated in the sectional view of FIG. 2. It is possible to see drum 6 placed within the half-arch 4, integral with column 2. Screw 16 has been loosened, in order that rod 15 can slide in guide tube 14. Initially the waste material 7 is introduced into drum 6, without compaction, until the drum is completely filled. Then, the cardboard precover 20 is placed on the upper part of waste 7 and the latter is forced down by means of compression disk 17 and rod 15, on which action takes place by means of lever 26. During this movement, waste material is compacted and the downward movement of precover 20 is made possible by the deformation of its edges, whereof the different sectors 21 have been raised. When the waste material has been compacted to the maximum, the pressure exerted on rod 15 is released and the latter is raised. The waste material swells due to its elasticity and push precover 20 upwards but, when the latter arrives at the level of one of the grooves 8, it can be seen that its edges tend to reassume their normal position and the rising movement stops, because the edges of precover 20 are locked in groove 8. An adequate locking can be obtained by the mere friction of the edges of the precover, on the lateral wall of the drum. Thus, it can take place outside the groove on a drum equipped therewith, or at a random level on a drum not provided with grooves. At this instant, the cycle is recommenced by placing waste material above precover 20 and the operation is continued with another precover until the drum is completely filled. It can also be seen in FIG. 2 that during each compaction cycle, drum 6 is closed by the centrally perforated cover 18, because the said cover has been threaded on to rod 15 before screwing compression disk 17 on to the bottom thereof. When filling is ended, the drum is finally sealed with its tight cover.

FIGS. 3*a* to 3*c* summarise the different stages of the process according to the invention. FIG. 3*a* shows drum 6 placed in the half-arch 4 and completely filled with uncompressed or uncompacted waste material 7. This is followed by the installation of precover 20 having radial slots 22, followed by the installation of lever 26, as indicated in FIG. 3*b*. During the first compression, which corresponds to the compacting of the waste material in the lowest part of drum 6, the lever is placed in recess **28*a* positioned in the lower part of support 10 and is in position 26*a* shown by continuous lines in the drawing. During the last cycle, when waste material is placed in the upper part of drum 6, the lever is placed in recess 28*b* and is then in position 26*b*** shown diagrammatically by the broken lines. Finally, FIG. 3*c* shows the interior of the drum after the first compaction cycle. It is possible to see within drum 6, precover 20, which is immobilized because its edges, having radial slots 22, are locked in groove **8*a***, which is the first groove starting from the lower part of the drum.

The process and apparatus according to the invention offer numerous advantages, the first being an increase in the efficiency of the drum filling operations, due to a filling level three to four times greater than conventional filling levels. Moreover, there is a reduction in the number of drums used and in the transportation costs, because a single container is sufficient, where three or four were required with the prior art methods. In addition, the contamination is limited, because the thus stored waste is not very active and the cardboard precover is sufficient to limit contamination by the provisional seal which it offers between two compaction cycles. Moreover, the operator does not directly manipulate the contaminated products and finally, the apparatus has a very simple and consequently inexpensive construction and can optionally be modified for simultaneous filling of several drums.

Obviously the invention is not limited to the embodiment described hereinbefore and numerous variants can be envisaged without passing beyond the scope of the invention.

For example, it is possible to adapt the shape and dimensions of the various elements of the apparatus as a function of the drums used, or choose a material other than cardboard for the precover 20, the essential point being that it is possible to make its edges deformable in order to permit its forcing into the drum and its locking on the walls, or in the grooves thereof.

It is also possible to place within the drum a bag made from a sufficiently resistant plastic material, eliminate the compression disk by using a more rigid precover and adopting a horizontal or oblique non-vertical configuration for the apparatus.

Lever 26 can optionally be replaced by an electric, hydraulic or pneumatic device, permitting the displacement of rod 15 under the same conditions as described hereinbefore.

Another improvement can consist of using a device for recovering the contaminated air trapped in the volume between cover 18 and precover 20 during the compression operation and this can then be passed to a protective discharge filter.

What is claimed is:

1. A process for storing by compacting waste comprising contaminated flexible materials in a drum comprising the steps:

(a) placing the waste in a drum, (b) placing above the waste in said drum a precover having a diameter slightly greater than the internal diameter of the drum, said precover having an outer edge which is deformable, (c) inserting the precover into the drum to compact the waste therein, said insertion resulting in a deformation of the edges of said precover and withdrawal of the precover from said drum being prevented after compaction by friction between said deformed edge of the precover and the drum walls, (d) and repeating steps (a), (b), and (3) until said drum is filled.

2. The process of claim 1 wherein said precover comprises a cardboard disk provided with radial slots on its edges.

3. The process of claim 1 wherein said drum is provided with at least one annular groove and said precover is locked into said groove during step (c).

4. The process of claim 1 wherein said waste is radioactive.

* * * * *